June 12, 1956   H. J. HORN   2,750,012
BRAKE DRUM
Filed May 27, 1952

INVENTOR.
HARRY J. HORN
BY
ATTORNEYS

United States Patent Office 2,750,012
Patented June 12, 1956

2,750,012

BRAKE DRUM

Harry J. Horn, Lansing, Mich., assignor to Motor Wheel Corporation, Lansing, Mich., a corporation of Michigan Application May 27, 1952, Serial No. 290,221

16 Claims. (Cl. 188—218)

This invention relates to brake drums and more particularly to brake drums having centrifugally cast liners and the method of making such drums.

In the manufacture of vehicle wheel brake drums with a centrifugally cast metal liner it is common practice to cast the liner in a metal ring, then divide the ring circumferentially into two brake drum shells, and thereafter attach the brake drum shells to drum backing members as shown in U. S. Patent Reissure No. 20,043. The drum is in turn mounted on the hub of a vehicle wheel. The brake shoes which cooperate with the cast metal liner are mounted on a backing plate which overlies the open end of the drum and is supported by the wheel axle housing. In order to prevent dirt from getting into the drum, a channel-shaped groove is usually machined in the outer end face of the cast metal liner and the backing plate is provided with a circumferential flange which is arranged to project into this channel-shaped groove.

The present invention has for an object the provision of a novel form of brake drum having a cast metal liner which is simple in construction and economical to manufacture.

Another object of the invention resides in the provision of a novel method of making such brake drums which eliminates the necessity of machining the channel-shaped grooves in the outer end face of the cast metal liner.

Figure 1:
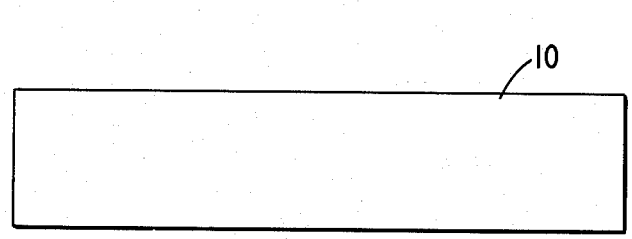
Fig. 1 is a plan view of a sheet metal blank used in forming the braking ring of the improved brake drum.
Figure 2:
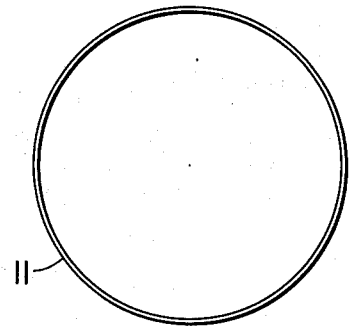
Fig. 2 shows the brake ring formed from the blank illustrated in Fig. 1.

In making the brake drum of the present invention a metal blank 10 of sheet metal is first formed into a hoop and the ends welded together in any suitable manner to form a cylindrical ring 11. Thereafter, the ring 11 is rolled by suitable apparatus into the cross sectional shape illustrated in Fig. 3. The circumferential edge portions of ring 11 are turned inwardly as at 12 to form flanges 13, and the central portion of ring 11 is offset radially outwardly as at 14 to form a circumferential recess 15. Adjacent the recess 15 ring member 11 is fashioned with circumferential ridges 16 which define annular grooves 17 on the inside face of ring 11. Ridges 16 are connected with the offset portion 14 by annular flanges 18. The flanges 18 are preferably offset radially outwardly from the flat cylindrical portions 19 of the ring 11 a distance corresponding approximately to the thickness of the metal from which the ring 11 is formed. The transformation of the ring 11 from the shape shown in Fig. 2 to the cross section shown in Fig. 3 is generally done in several rolling operations.

Figure 3:
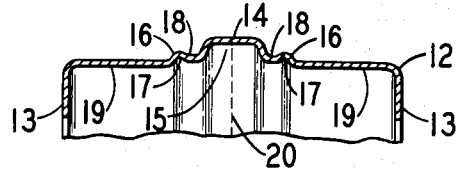
Fig. 3 is a fragmentary sectional view showing the shape into which the ring illustrated in Fig. 2 is rolled.
Figure 4:
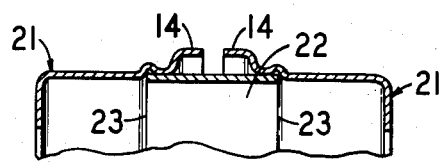
Fig. 4 is a fragmentary sectional view illustrating the step of assembling the severed half portions of the ring shown in Fig. 3 with an auxiliary ring.
Figure 9:
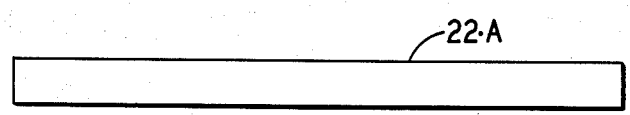
Fig. 9 is a plan view of the blank from which the ring shown in Fig. 8 is formed.

After the ring is rolled into the cross section shown in Fig. 3 it is cut circumferentially as at 20 into two half sections 21. Thereafter, an auxiliary ring 22 which is formed from a sheet metal blank 22A (Fig. 9) is mounted between ring sections 21 as illustrated in Fig. 4. Ring 22 is dimensioned such as to have a slight press fit within the offset flanges 18 of ring 11. Thus, when the two ring sections 21 are telescoped over the opposite ends of the ring 22, the edges 23 of ring 22 abut against the ridge portions 16 and maintain the two ring portions in a fixed spaced apart relation. Thereafter, the edges 23 are rolled into the grooves 17 as indicated at 24 to lock the ring sections 21 and the ring 22 together as clearly shown in Fig. 5 and thereby provide a generally cylindrical casing the end walls of which are formed by the flanges 13.

Figure 5:
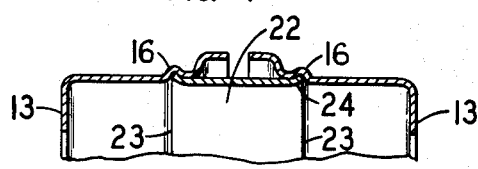
Fig. 5 is a fragmentary sectional view illustrating the step of crimping the auxiliary ring into engagement with the braking rings.
Figure 6:
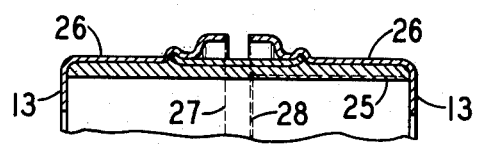
Fig. 6 is a fragmentary sectional view of the assembly illustrated in Fig. 5 after a metal liner has been cast therein.
Figure 7:
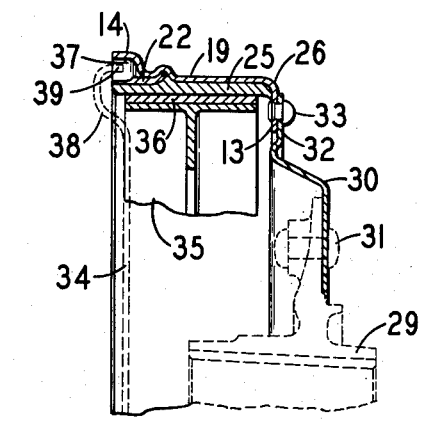
Fig. 7 is a fragmentary sectional view showing the completed brake drum.
Figure 8:
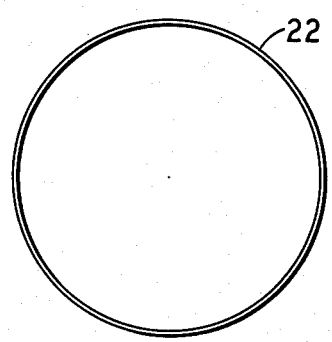
Fig. 8 is a view showing the auxiliary ring.

Molten cast iron is then centrifugally cast by suitable apparatus into the casing shown in Fig. 5 to form a cast line 25 which is fused to the inner faces of the cylindrical portions 19 of ring sections 21 and ring 22. The liner 25 thus provides an integral connection between the ring 22 and the ring sections 21. The liner 25 is machined to an accurate internal diameter after the assembly is divided into two paired brake drum shells 26 by machining along the lines indicated at 27 and 28.

The brake drum shells 26 are mounted on a hub 29 by means of a drum backing member 30. Drum backing member 30 is mounted on hub 29 as by rivets 31 and is provided with a circumferential flange 32 which overlies flange 13 and which may be secured thereto as by rivets 33. A backing plate 34 mounted on the vehicle axle housing (not shown) pivotally supports brake shoes 35. Shoes 35 are provided with a brake lining 36. It will be observed that the liner 25 provides a braking surface for the shoe lining 36 and that the shoe lining 36 extends substantially entirely across the liner 25. It will also be observed that the inner portion of liner 25 is backed by the cylindrical portion 19 of ring 22, and adjacent the open end of the brake drum the liner is backed by ring 22. Thus, throughout its axial extent the liner 25 is supported by a steel backing.

Ring 22 and the offset portion 14 of ring sections 21 cooperate to define a channel groove 37 around the open end of the brake drum shell 26, the offset portion 14 forming the outer wall of the groove and the ring 22 forming the inner wall of the groove. Backing plate 34 is fashioned around its outer edge with an offset circumferential portion 38 which encloses the outer end portion of liner 25 and ring 22. The free edge portion 39 of the offset 38 is disposed within groove 37 and cooperates therewith to provide an effective seal that prevents dirt and the like from getting into the brake drum.

I claim:

1. A brake drum comprising an annular brake drum shell having a generally cylindrical braking flange, the free edge portion of said flange being offset radially outwardly from the plane of said flange, a ring member telescopically arranged within said cylindrical flange, said ring extending axially from the open end of said brake drum shell inwardly beyond said radially offset edge portion and cooperating with said radially offset edge portion to provide a circumferential groove around the free edge of said flange, and a cast metal liner overlying and fused to the inner face of said flange and said ring, said lining extending axially on said ring beyond the portion thereof telescopically engaged with said cylindrical flange.

2. The brake drum set forth in claim 1 wherein said groove extends in a direction generally axially of said cylindrical flange.

3. The brake drum set forth in claim 1 wherein said liner is fused to the inner surfaces of said flange and ring.

4. The brake drum set forth in claim 1 wherein said shell includes a drum backing member secured to the edge of said flange opposite said free edge portion, said circumferential groove defining the open end of said brake drum shell, and including a backing plate arranged over said open end of said shell, said backing plate having an annular flange projecting into said groove.

5. The brake drum set forth in claim 1 wherein said circumferential groove extends generally axially of said braking flange and defines the open end of said brake drum shell and including a backing plate arranged over said open end of said shell, said backing plate having an axially extending flange projecting into said groove.

6. The method of making a brake drum which comprises the steps of providing a cylindrical shell, displacing a central circumferential portion of said shell radially outwardly, severing said radially offset portion circumferentially to divide the shell into two half sections, telescopically engaging said shell half sections over the opposite ends of a cylindrical ring with the cylindrical portions of said half sections which are axially adjacent said radially offset portions overlying the opposite edge portions of said ring to form a generally cylindrical casing with said radially offset portions adjacently disposed and spaced from the outer surface of said ring, casting a cylindrical metal liner within said casing, said liner extending axially over the inner cylindrical surface of said shell half sections and said cylindrical ring, and thereafter severing said casing and the liner therein circumferentially at said radially offset portions to form two cylindrical brake drums each having a circumferential groove at one end thereof defined by said ring and said radially offset portion.

7. The method of making a brake drum which comprises the steps of providing a cylindrical shell, displacing a central circumferential portion of said shell radially outwardly, severing said radially offset portion circumferentially at its midsection to divide the shell into two half sections, positioning said shell half sections over the opposite ends of a generally cylindrical ring having an outer diameter corresponding to the inner diameter of the portions of said shell half sections which are not radially offset to form a generally cylindrical casing with the radially offset portions adjacently disposed and spaced from the outer surface of said ring, casting a cylindrical metal liner within said casing, said liner extending axially over the inner cylindrical surface of said shell half sections and said cylindrical ring, and thereafter severing said casing and the liner therein circumferentially at said radially offset portions to form two cylindrical brake drums each having a circumferential groove at one end thereof defined by said ring and said radially offset portion.

8. The method defined in claim 7 including the steps of forming axially spaced circumferential grooves on the inner cylindrical surface of said shell one at each side of said central radially offset portion and displacing circumferential portions of said cylindrical ring outwardly into engagement with said grooves to lock said shell half sections and said ring together.

9. The method defined in claim 7 including the steps of forming axially spaced circumferential grooves on the inner cylindrical surface of said shell one at each side of said central radially offset portion and bending the opposite circumferential end portions of said ring into said grooves to lock said shell half sections and said ring together.

10. The method of making a brake drum which comprises the steps of providing a generally cylindrical shell having radially inwardly turned flanges at each end thereof, displacing a central circumferential portion of said shell radially outwardly, severing said shell circumferentially into two half sections each having an enlarged circumferential edge portion at the open end thereof formed by said radially outwardly displaced portions, positioning said half sections over the opposite ends of a cylindrical ring to form a generally cylindrical casing the end walls of which are formed by said radially inwardly turned flanges, casting a circumferentially continuous metal liner against the inner cylindrical surface of said shell sections and said cylindrical ring, and thereafter severing said casing circumferentially at the axially central portion thereof into two half sections so that said cylindrical ring cooperates with said radially offset portion to define an annular groove.

11. The method defined in claim 10 including the steps of forming a pair of axially spaced grooves on the cylindrical surface of said shell, one groove at each side of said radially offset portion and displacing the circumferential edge portions of said cylindrical ring at each end thereof into said grooves.

12. The method of forming a brake drum which comprises the steps of providing two similarly shaped brake drum shells each having a radially inwardly turned flange at one end thereof and a radially outwardly offset circumferential flange portion at the other end thereof, positioning said brake drum shells over the opposite ends of a cylindrical ring with said radially offset flanges adjacently positioned in opposed relation and with said cylindrical ring engaging the central cylindrical portion of said brake drum shells to form a generally cylindrical casing the end walls of which are formed by said radially inwardly turned flanges, casting a circumferentially continuous metal liner against the inner cylindrical surface of said shells and said cylindrical ring, and thereafter severing said casing circumferentially at the axially central portion thereof into two half sections.

13. The method set forth in claim 12 wherein said central cylindrical portions of said brake drum shells are dimensioned to have a press fit over the opposite ends of said cylindrical ring.

14. The method set forth in claim 12 including the step of forming circumferential grooves on the inner cylindrical surface of said central portions of said brake drum shells and turning the circumferential edge portions at each end of said cylindrical ring outwardly into engagement with said grooves to lock said brake drum shells on said cylindrical ring.

15. A brake drum comprising a drum backing member, an annular braking ring secured at one edge to said drum backing member, said braking ring having a generally cylindrical inner surface extending axially away from said drum backing member, the free edge portion of said braking ring being offset radially outwardly of said cylindrical surface, an auxiliary ring positioned within said braking ring and extending axially from said generally cylindrical inner surface in spaced relation to said offset edge portion, and a cast metal liner overlying and fused to said cylindrical surface and said auxiliary ring, said offset portion and said auxiliary ring cooperating to form a circumferential channel around the open end of said braking ring, said auxiliary ring having an axial extent substantially less than the axial extent of said braking ring, said braking ring being formed with an annular groove spaced axially inwardly of said radially offset portion and the inner circumferential edge portion of said auxiliary ring being engaged within said groove.

16. A brake drum comprising a brake drum shell having a generally cylindrical braking flange, said flange having the free edge portion thereof offset radially outwardly, a cylindrical ring member arranged in contacting relation with the inner face of said flange and extending axially of said shell in spaced relation with said radially offset portion, said ring member cooperating with said radially offset portion to define around the free edge of said flange an axially extending channel, and a lining of cast metal fused to the inner faces of said flange and said ring, said flange being formed with an annular groove spaced axially inwardly of said offset portion, said ring member having its axially inner edge portion engaged within said last mentioned groove.

References Cited in the file of this patent

UNITED STATES PATENTS

| | | |
|---|---|---|
| 1,826,381 | Chase | Oct. 6, 1931 |
| 2,003,063 | Batie | May 28, 1935 |
| 2,056,528 | Linabury | Oct. 6, 1936 |
| 2,153,364 | Campbell | Apr. 4, 1939 |
| 2,316,029 | Van Halteren | Apr. 6, 1943 |